US009042093B2

(12) United States Patent
Pang et al.

(10) Patent No.: US 9,042,093 B2
(45) Date of Patent: May 26, 2015

(54) ELECTRONIC DEVICE WITH MOUNTING APPARATUS FOR SOLID STATE DISK

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Wei Pang, Shenzhen (CN); Al-Ling He, Shenzhen (CN); Wan-Li Ning, Shenzhen (CN)

(73) Assignees: HONG FU JIN PRECISION INDUSTRY (Shenzhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 226 days.

(21) Appl. No.: 13/859,733

(22) Filed: Apr. 10, 2013

(65) Prior Publication Data

US 2014/0247550 A1    Sep. 4, 2014

(30) Foreign Application Priority Data

Mar. 1, 2013    (CN) .......................... 2013 1 0064684

(51) Int. Cl.
*G06F 1/16*    (2006.01)
*G06F 1/18*    (2006.01)

(52) U.S. Cl.
CPC ................ *G06F 1/187* (2013.01); *G06F 1/185* (2013.01)

(58) Field of Classification Search
CPC ...................................................... G06F 1/187
USPC ........................................ 361/679.33–679.39
See application file for complete search history.

(56) References Cited

U.S. PATENT DOCUMENTS 8,218,315 B2 *    7/2012    Lu ............................ 361/679.58

* cited by examiner

*Primary Examiner* — Ramon Barrera
(74) *Attorney, Agent, or Firm* — Novak Druce Connolly Bove + Quigg LLP

(57) ABSTRACT

A mounting apparatus for a solid state disk includes a bracket and a latching module. The bracket includes a connecting pole and a supporting member mounted to the connecting pole. The latching module is installed to the supporting member, and comprises a latching member. The supporting member includes a position pole mounted to the connecting pole and a supporting bar perpendicularly extending out from the position pole. The position pole defines a latching slot facing the supporting bar for positioning an end of the solid state disk. The supporting bar defines a guiding slot facing the latching slot for receiving a side of the solid state disk. The latching member is to latch onto the solid state disk.

17 Claims, 8 Drawing Sheets

ELECTRONIC DEVICE WITH MOUNTING APPARATUS FOR SOLID STATE DISK

BACKGROUND

1. Technical Field

The present disclosure relates to electronic devices, and particularly to an electronic device with an apparatus for mounting solid state disks.

2. Description of Related Art

Servers often include a plurality of solid state disks mounted in the server chassis. However, it is inconvenient to install or uninstall the solid state disks during maintenance or replacement of the servers.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
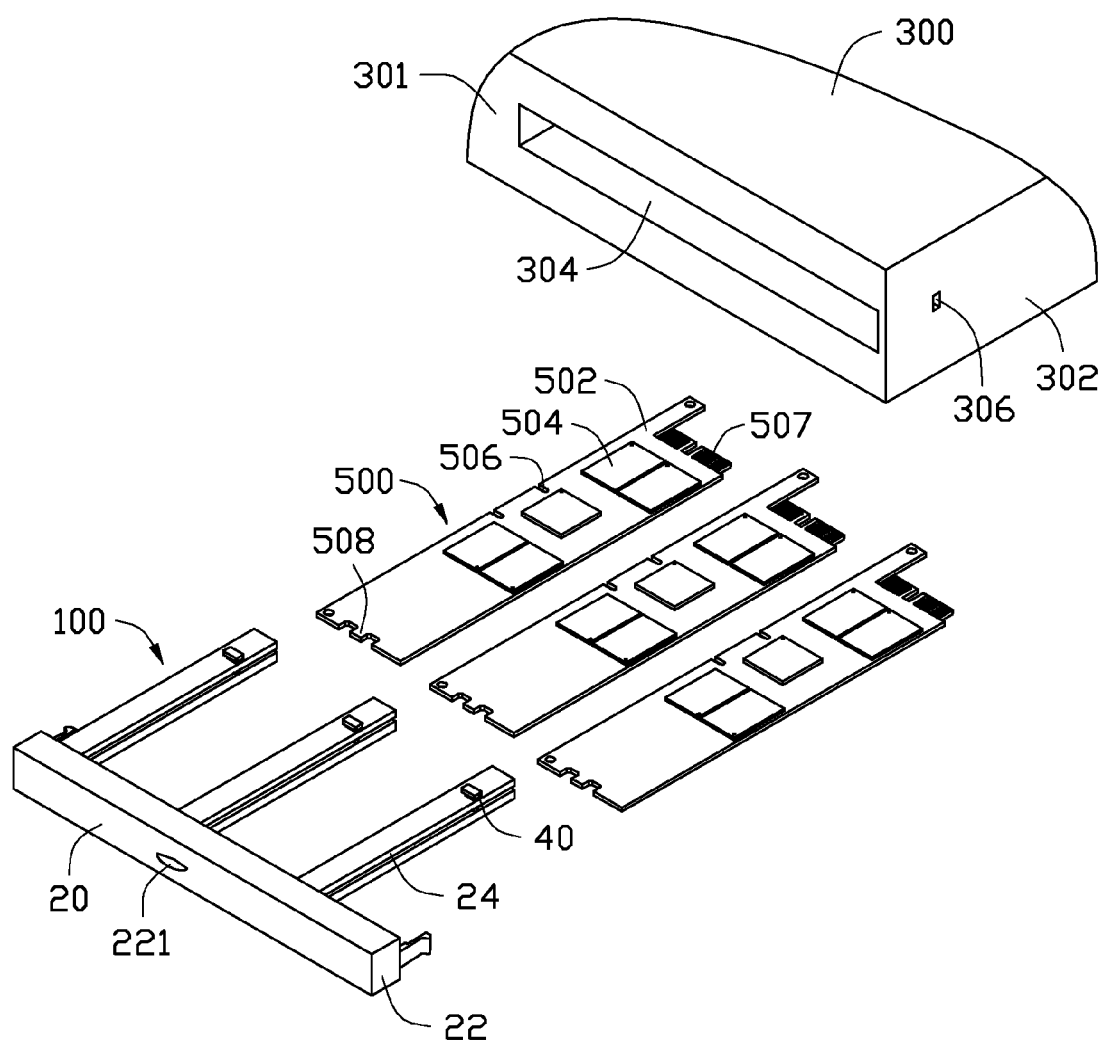
FIG. 1 is an exploded, isometric view of an embodiment of an electronic device together with a plurality of solid state disks, wherein the electronic device includes a mounting apparatus.
Figure 2:
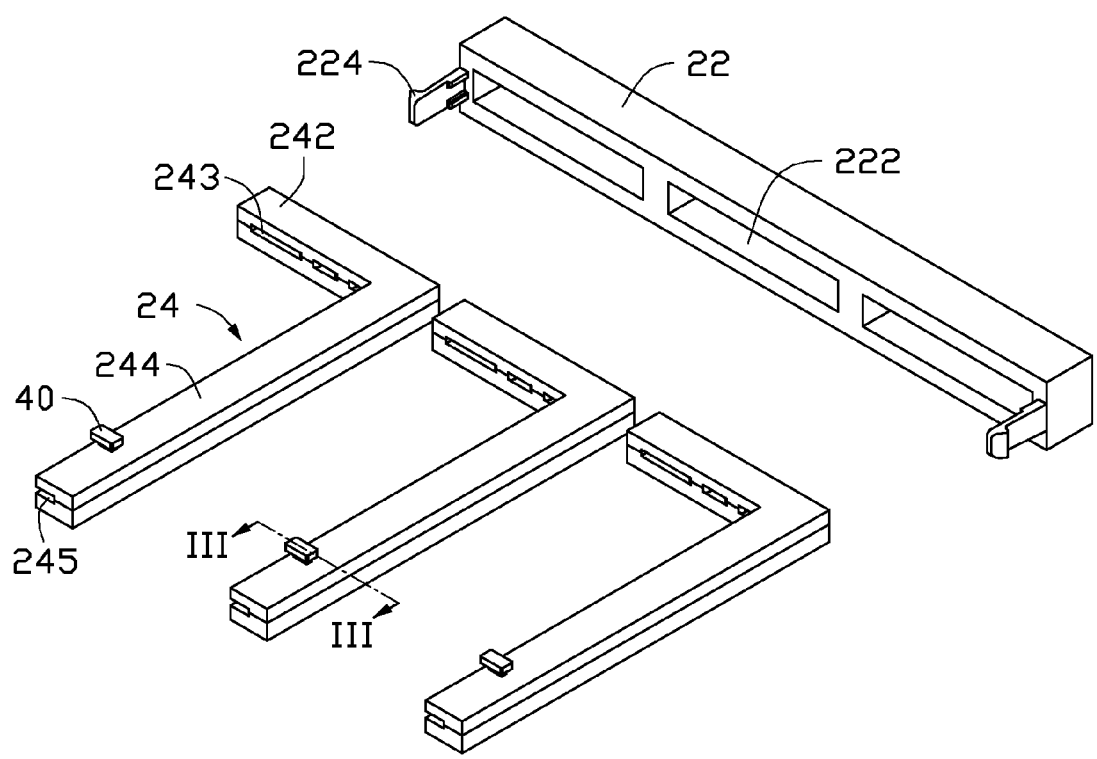
FIG. 2 is an exploded, isometric view of the mounting apparatus of FIG. 1, but shows another perspective.

FIGS. 1 and 2 show an exemplary embodiment of an electronic device including a casing 300, a mounting apparatus 100, and three solid state disks 500 detachably mounted to the mounting apparatus 100. The mounting apparatus 100 includes a bracket 20 and three latching modules 40. In the embodiment, the electronic device is a server.

The casing 300 is a rectangular shell and includes a front wall 301 and two opposite sidewalls 302 perpendicularly extending rearward from two ends of the front wall 301. The casing 300 defines an expansion bay 304 extending through the front wall 301, for fixing a compact disk read-only memory drive therein. The sidewalls 302 define two opposite latching holes 306 communicating with the expansion bay 304, adjacent to the front wall 301.

Each solid state disk 500 includes a rectangular circuit board 502 and a plurality of chips 504 mounded on the circuit board 502. A side of the circuit board 502 defines a cutout 506. A connector 507 is formed on a first end of the circuit board 502, and a plurality of pieces 508 extend out from a second end of the circuit board 502 opposite to the connector 507. The connector 507 can be used to connect a serial advanced technology attachment connector of the electronic device.

The bracket 20 includes a rectangular connecting pole 22 and three L-shaped supporting members 24. A front surface of the connecting pole 22 defines an operation slot 221, for expediently operating the bracket 20. Two resilient hooks 224 perpendicularly extend rearward from two opposite ends of the connecting pole 22. A rear surface of the connecting pole 22 longitudinally defines three position slots 222.

Figure 3:
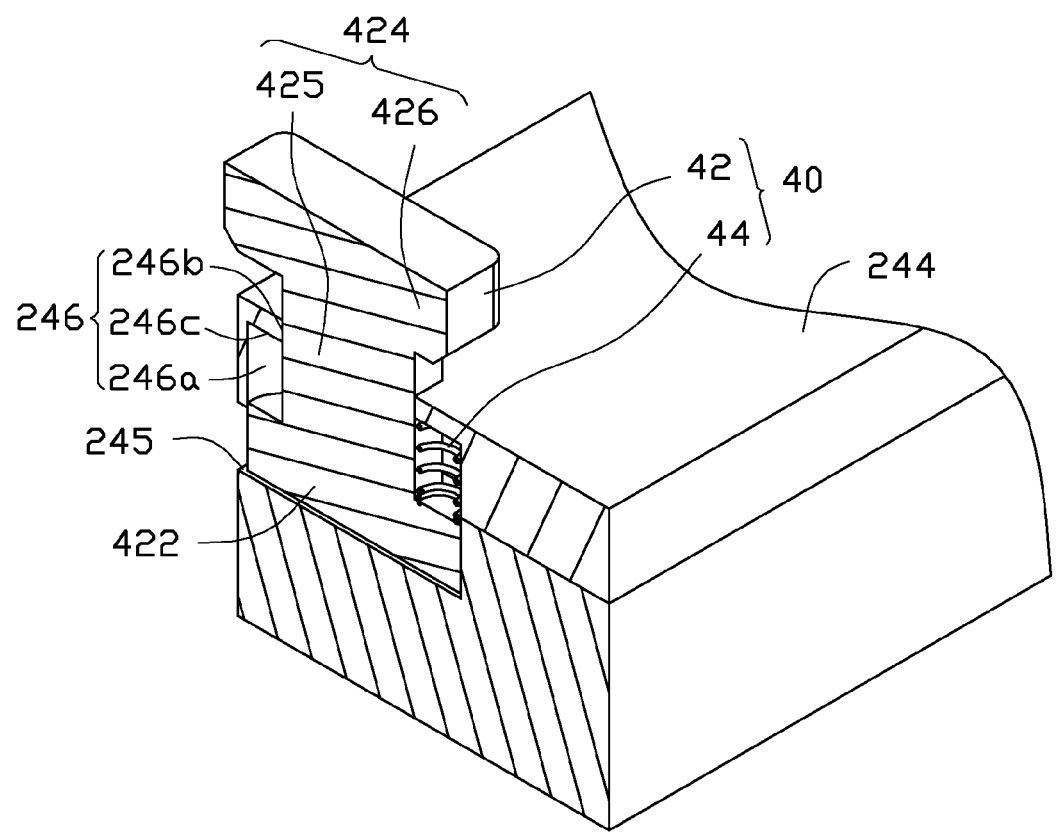
FIG. 3 is a partial, cutaway view of FIG. 2, taken along the line of III-III.

Referring to FIG. 3, each supporting member 24 include a position pole 242 and a supporting bar 244 perpendicularly extending rearward from an end of the position pole 242. A rear surface of the position pole 242 longitudinally defines a plurality of latching slots 243. An inner surface of the supporting bar 244 facing the position pole 242 longitudinally defines a guiding slot 245. A first end of the guiding slot 245 extends through a distal end of the supporting bar 244 opposite to the position pole 242, and a second end of the guiding slot 245 communicates with the corresponding latching slot 243. The supporting bar 244 defines a stepped hole 246, away from the position pole 242. The stepped hole 246 includes a first hole 246a communicating with the guiding slot 245, and a second hole 246b extending through the top of the supporting bar 244 and communicating with the first hole 246a. The second hole 246b has a less diameter than the first hole 246a. A stepped portion 246c is formed in the first hole 246a, at a junction of the first hole 246a and the second hole 246b.

Each latching module 40 includes a latching member 42 and a resilient member 44. The latching member 42 is substantially H-shaped, and includes a sliding pole 425 slidably received in the second hole 246b of the corresponding supporting member 24, a latching block 422 perpendicularly protruding out from a first end of the sliding pole 425 received in the first hole 246a, and an operation block 426 perpendicularly protruding out from a second end of the sliding pole 425 opposite to the latching block 422. The second end of the sliding pole 425 is exposed out of the top of the supporting bar 244. The resilient member 44 is resiliently sandwiched between the stepped portion 246c and the latching block 422. In the embodiment, the resilient member 44 is a spring.

Figure 4:
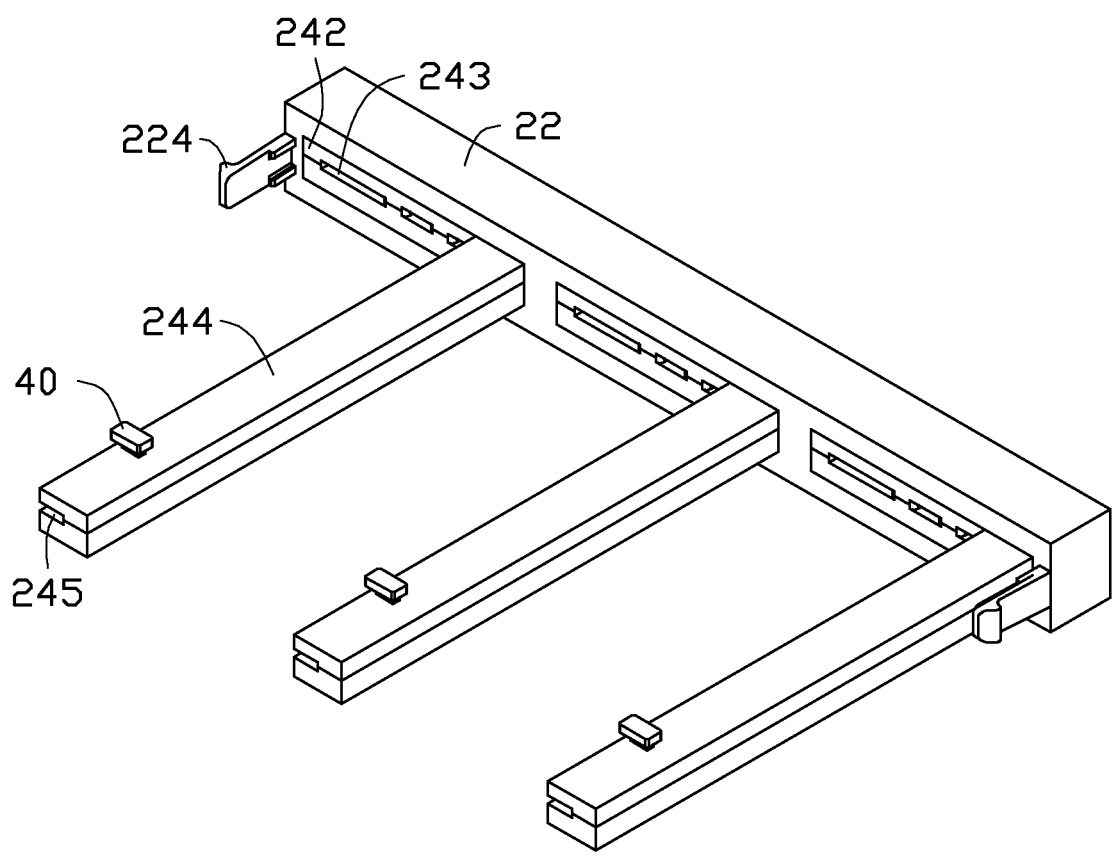
FIG. 4 is an assembled, isometric view of the mounting apparatus of FIG. 2.

FIG. 4 shows that in assembly of the supporting members 24 to the connecting pole 22, the position poles 242 of the supporting members 24 are inserted in the position slots 222 of the connecting pole 22.

Figure 5:
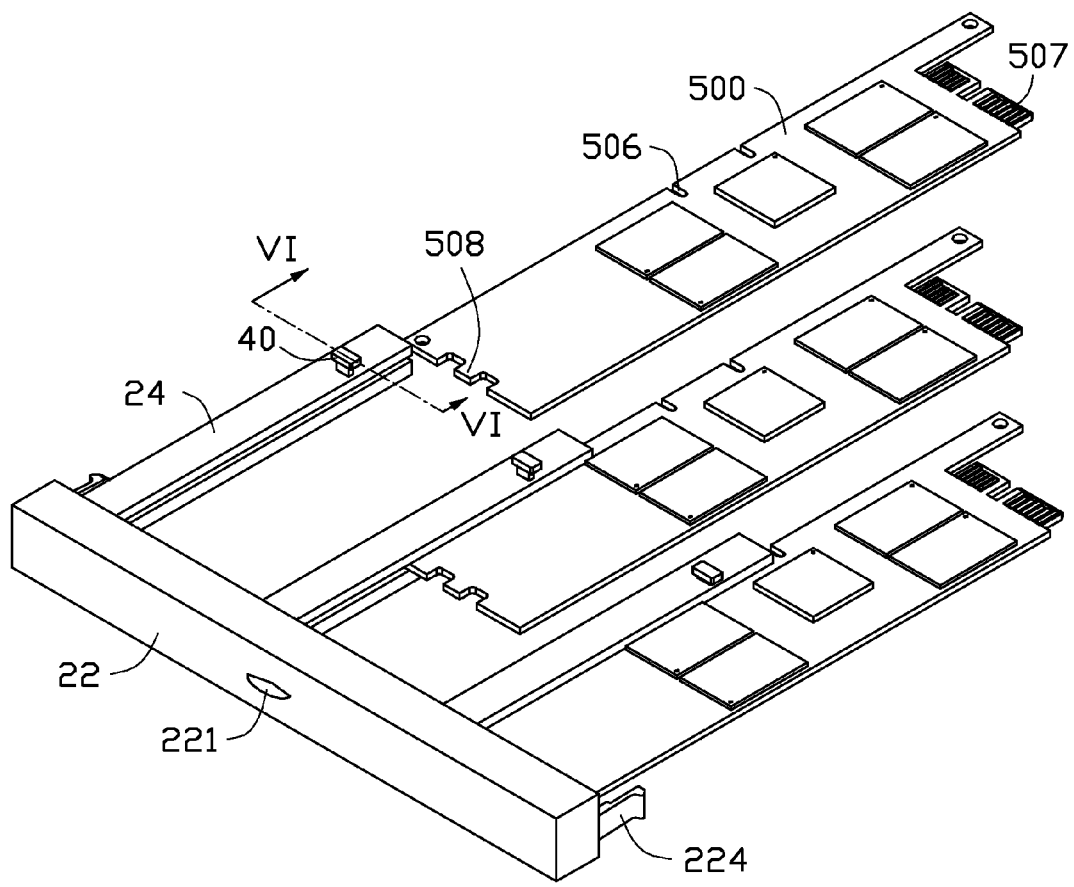
FIGS. 5-8 are schematic, isometric views of FIG. 1, but show different processes of assembling the state disk disks.
Figure 6:
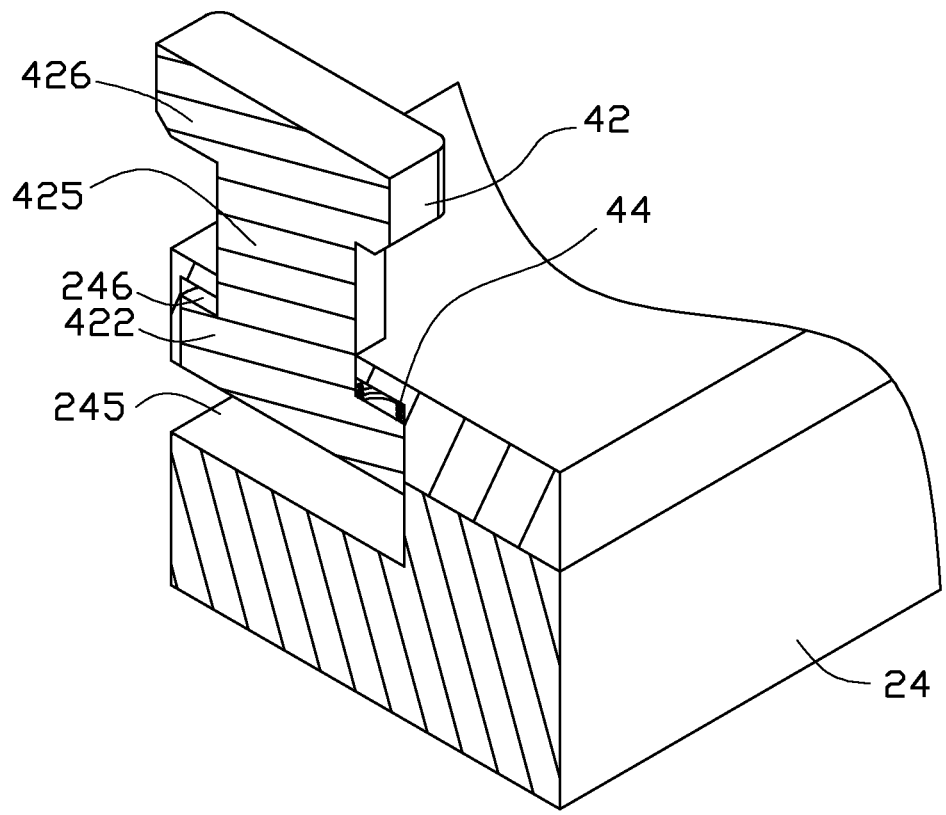

Referring to FIGS. 5 and 6, to mount the solid state disks 500 to the mounting apparatus 100, the operation block 426 of each latching member 42 is pulled away from the corresponding supporting bar 244, to allow the sliding pole 425 to move out along the second hole 246b, until the latching block 422 is received in the first hole 246a. The resilient member 44 is deformed. The pieces 508 of each solid state disk 500 are aligned with the latching slots 243 of the corresponding position pole 242, and the side of the circuit board 502 defining the cutouts 506 is slidably inserted into the guiding slot 245 of the supporting bar 244, until the pieces 508 are inserted into the latching slots 243 and the cutout 506 aligns with the latching block 422. The pull force is removed, and the resilient member 44 is restored to bias the latching block 422 to be inserted into the cutout 506 of the solid state disk 500.

Figure 7:
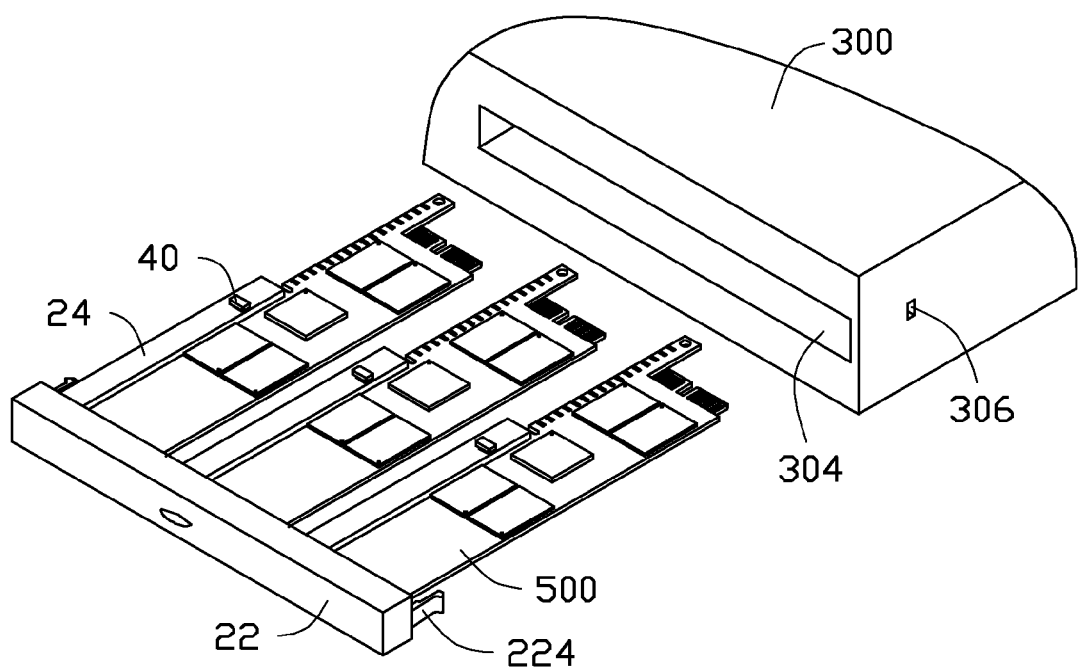
Figure 8:
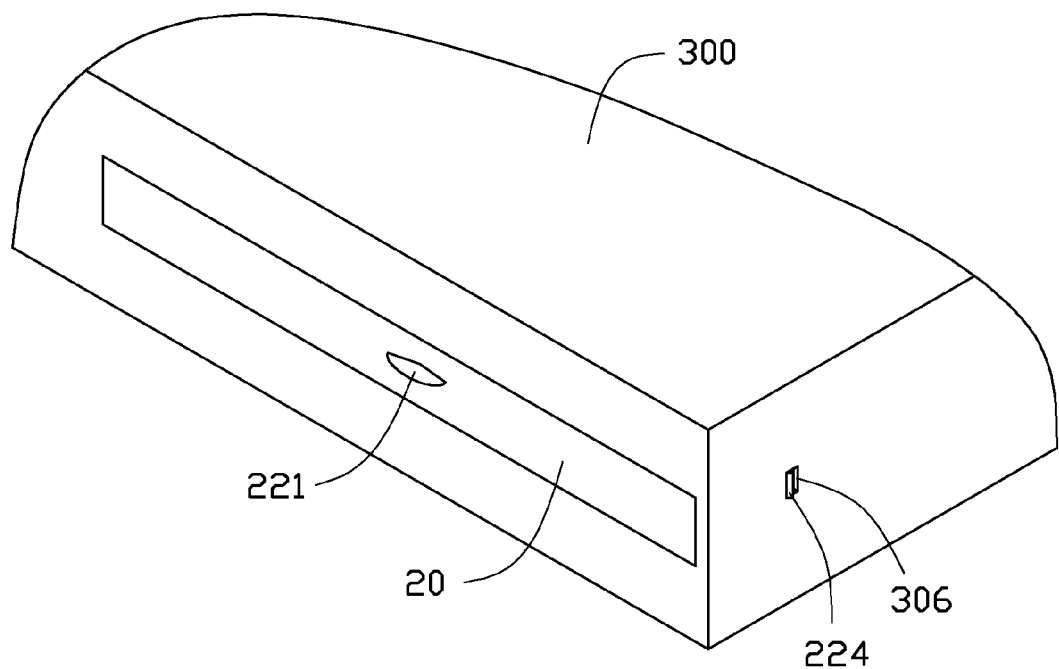

Referring to FIGS. 7 and 8, to mount a combination of the mounting apparatus 100 and the solid state disks 500 to the casing 300, the connectors 507 of the solid state disks 500 are inserted into the expansion bay 304 of the casing 300, through the front wall 301. The hooks 224 are slidably abutted against two opposite inner surfaces of the expansion bay 304, deforming the hooks 224, until the hooks 224 are aligned with the latching holes 306. The hooks 224 are restored to latch in the latching holes 306. The connectors 507 are connected to the SATA connectors of the electronic device, and the solid state disks 500 are installed in the expansion bay 304.

To detach the solid state disks 500 from the mounting apparatus 100, a combination of the mounting apparatus 100 and the solid state disks 500 is pulled out from the expansion bay 304 through the fingers of operation in the operation slot 221. The hooks 224 are slidably abutted against two inner surfaces of the latching holes 306, deforming the hooks 224 toward each other, until the hooks 224 disengage from the latching holes 306, and the connectors 507 of the solid state disks 500 disengage from the SATA connectors of the electronic device. The mounting apparatus 100 is easily pulled out from the expansion bay 304. The operation blocks 426 are pulled away from the corresponding supporting bars 244, until the latching blocks 422 are disengaged from the cutouts 506 of the corresponding solid state disks 500. Therefore, the solid state disks 500 can be easily detached from the mounting apparatus 100.

While the disclosure describes examples and embodiments, it is to be understood that the disclosure is not limited thereto. To the contrary, the disclosure is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A mounting apparatus for a solid state disk, comprising:
a bracket comprising a connecting pole and a supporting member, and
a latching module installed to the supporting member, and comprising a latching member;
wherein the supporting member comprises a position pole mounted to the connecting pole and a supporting bar extending out from the position pole in a substantially perpendicular manner, the position pole defines a latching slot facing the supporting bar for positioning an end of the solid state disk, the supporting bar defines a guiding slot facing the latching slot for receiving a side of the solid state disk, the latching member is to detachably latch onto the solid state disk.

2. The mounting apparatus of claim 1, wherein the supporting bar defines a stepped hole, the stepped hole comprises a first hole communicating with the guiding slot, and a second hole extending through a top of the supporting bar and communicating with the first hole, the second hole has a less diameter than the first hole, the latching member comprises a sliding pole slidably received in the second hole of the supporting member and a latching block protruding out from an first end of the sliding pole and received in the first hole, the latching block is operable to be inserted into the guiding slot to engage in a cutout of the solid state disk.

3. The mounting apparatus of claim 2, wherein a stepped portion is formed in the first hole and at a junction of the first hole and the second hole, the latching module further comprises a resilient member sandwiched between the stepped portion and the latching block, the resilient member bias the latching block to be inserted into the guiding slot to engage in the cutout of the solid state disk.

4. The mounting apparatus of claim 2, wherein the latching member further comprises an operation block protruding out from a second end of the sliding pole opposite to the latching block, the operation block is exposed out of the top of the supporting bar through the second hole.

5. The mounting apparatus of claim 2, wherein the supporting member is substantially L-shaped, the supporting bar perpendicularly extends from an end of the position pole, the guiding slot extends along a lengthwise direction of the supporting bar, a first end of the guiding slot extends through a distal end of the supporting bar opposite to the position pole, and a second end of the guiding slot communicates with the latching slot.

6. The mounting apparatus of claim 1, wherein the connecting pole defines a position slot extending along a lengthwise direction of the connecting pole, for receiving the position pole of the supporting member.

7. The mounting apparatus of claim 6, wherein the connecting pole defines an operation slot opposite to the position slot.

8. The mounting apparatus of claim 7, wherein two resilient hooks extend out from two opposite ends of the connecting pole opposite to the operation slot.

9. An electronic device, comprising:
a casing defining an expansion bay and comprising a front wall, the expansion bay extending through the front panel;
a solid state disk comprising a circuit board; and
a mounting apparatus comprising:
a bracket comprising a connecting pole detachably mounted in the expansion bay and a supporting member mounted to the connecting pole and inserted into the expansion bay, and
a latching module installed to the supporting member, and comprising a latching member;
wherein the supporting member comprises a position pole mounted to the connecting pole and a supporting bar extending out from the position pole in a substantially perpendicular manner, the position pole defines a latching slot facing the supporting bar for positioning a first end of the circuit board, the supporting bar defines a guiding slot facing the latching slot for receiving a side of the circuit board, the latching member is to latch onto the circuit board.

10. The electronic device of claim 9, wherein the supporting bar defines a stepped hole, the stepped hole comprises a first hole communicating with the guiding slot, and a second hole extending through a top of the supporting bar and communicating with the first hole, the second hole has a less diameter than the first hole, the latching member comprises a sliding pole slidably received in the second hole of the supporting member and a latching block protruding out from an first end of the sliding pole and received in the first hole, the side of the circuit board defines a cutout for receiving the latching block.

11. The electronic device of claim 10, wherein a stepped portion is formed in the first hole and at a junction of the first hole and the second hole, the latching module further comprises a resilient member sandwiched between the stepped portion and the latching block to bias the latching block to be inserted into the guiding slot to engage in the cutout of the circuit board.

12. The electronic device of claim 10, wherein the latching member further comprises an operation block protruding out from a second end of the sliding pole opposite to the latching block, the operation block is exposed out of the top of the supporting bar through the second hole.

13. The electronic device of claim 9, wherein a connector is formed on a second end of the circuit board opposite to the position pole, and a piece extends out from the first end of the circuit board and is inserted into the latching slot of the position pole.

14. The electronic device of claim 9, wherein the supporting member is substantially L-shaped, the supporting bar perpendicularly extends from an end of the position pole, the guiding slot extends along the lengthwise direction of the supporting bar, a first end of the guiding slot extends through a distal end of the supporting bar opposite to the position pole, and a second end of the guiding slot communicates with the latching slot.

15. The electronic device of claim 9, wherein the connecting pole defines a position slot extending along the lengthwise direction of the connecting pole, for receiving the position pole of the supporting member.

16. The electronic device of claim 15, wherein the connecting pole defines an operation slot opposite to the position slot.

17. The electronic device of claim 16, wherein the casing defines two opposite latching holes communicating with the expansion bay, two resilient hooks extend out from two opposite ends of the connecting pole opposite to the operation slot, to detachably latch in the latching holes.

* * * * *